US012333549B2

(12) United States Patent
Puehse et al.

(10) Patent No.: US 12,333,549 B2
(45) Date of Patent: Jun. 17, 2025

(54) SYSTEMS AND METHODS FOR USE IN DATA TAGGING

(71) Applicant: MASTERCARD INTERNATIONAL INCORPORATED, Purchase, NY (US)

(72) Inventors: Tobias Puehse, Stamford, CT (US); Minghai Huang, Wood-Ridge, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 85 days.

(21) Appl. No.: 18/135,669

(22) Filed: Apr. 17, 2023

(65) Prior Publication Data
US 2024/0346513 A1 Oct. 17, 2024

(51) Int. Cl.
*G06Q 20/40* (2012.01)
*G06Q 20/38* (2012.01)

(52) U.S. Cl.
CPC ......... *G06Q 20/405* (2013.01); *G06Q 20/385* (2013.01); *G06Q 20/40145* (2013.01)

(58) Field of Classification Search
CPC ............... G06Q 20/405; G06Q 20/385; G06Q 20/40145
USPC ....................................................... 705/44
See application file for complete search history.

(56) References Cited

U.S. PATENT DOCUMENTS

| | | | | |
|---|---|---|---|---|
| 8,438,089 | B1* | 5/2013 | Wasserblat | G06Q 40/02 705/317 |
| 10,204,337 | B1* | 2/2019 | Spector | G06Q 20/367 |
| 11,782,826 | B2* | 10/2023 | Durham | G06F 12/1408 711/163 |
| 2015/0066765 | A1* | 3/2015 | Banks | G06Q 20/023 705/44 |
| 2017/0031963 | A1* | 2/2017 | Merz | G06Q 20/322 |
| 2019/0116168 | A1* | 4/2019 | Garfinkle | G06F 21/552 |
| 2022/0398595 | A1* | 12/2022 | Puehse | G06Q 20/0855 |

* cited by examiner

*Primary Examiner* — Hai Tran
(74) *Attorney, Agent, or Firm* — Harness, Dickey & Pierce, P.L.C.

(57) ABSTRACT

Systems and methods are provided for use in verifying an interaction, between a user and a first party, in which the user is physically present at the first party. One example computer-implemented method includes receiving a data tag request for a transaction, from a first party, and generating a data tag for the transaction where the data tag includes an indicator of a type of user verification for the transaction. The method also includes storing the data tag in a data structure and transmitting the data tag to the first party, in response to the data tag request. The method then includes receiving, by a processing network, an authorization request including a data tag, verifying that the data tag from the authorization request matches the stored data tag, and in response to failed verification of the data tag in the authorization request, removing the data tag from the authorization request.

13 Claims, 3 Drawing Sheets

SYSTEMS AND METHODS FOR USE IN DATA TAGGING

FIELD

The present disclosure generally relates to systems and methods for use in data tagging, and in particular, to generating a data tag, which is specific to an interaction and which is passed along with authorization of the interaction as a basis to verify the interaction.

BACKGROUND

This section provides background information related to the present disclosure which is not necessarily prior art.

Interactions are known to take place among different parties. One example of such interactions includes a payment interaction, in which a purchasing party pays for a product, and another party delivers the product. The payment interaction may include a payment account as the source of the payment for the product. The account may be identified at the party delivering the product, through a payment card presented by the purchasing party. Alternatively, the account may be identified, for example, in e-commerce situations, by the purchasing party entering a payment credential. In the former situation, the payment card is "present" at the party providing the product, while in the later, the payment card is "not present" at the party providing the product.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Payment accounts may be used by users to fund purchases for products (e.g., goods and/or services, etc.) at first parties (e.g., merchants, etc.). When the users rely on physical cards to fund the purchases, the messaging related to the transaction (broadly, interaction) may indicate that the physical cards are present, or not. However, when a user relies on a payment credential on-file with the first party, the messaging related to the transaction may indicate card not present despite the user's physical presence at the first party. Accordingly, the card present or card not present data included in the messaging is generally insufficient to indicate other situations of the user being present at the first party.

Uniquely, the systems and methods herein provide for verifying an interaction, between a user and a first party, in which the user is present (e.g., physically present, etc.) at the first party, and based on a data tag for the specific interaction. The data tag provides an indication of the verification of the user (e.g., a physical presence of the user at the first party (e.g., via a "check-in" at the first party, etc.), an authentication of an identity of the user at or by the first party, etc.), whereby a liability for the interaction may be changed based on the more detail included in the data tag. In this manner, interactions are more accurately characterized, by the data tags, to inform related parties of the specific authentication and/or verification associated with the interaction. As such, by way of the data tags herein, efficiencies and confidences of the interactions may be enhanced.

Figure 1:
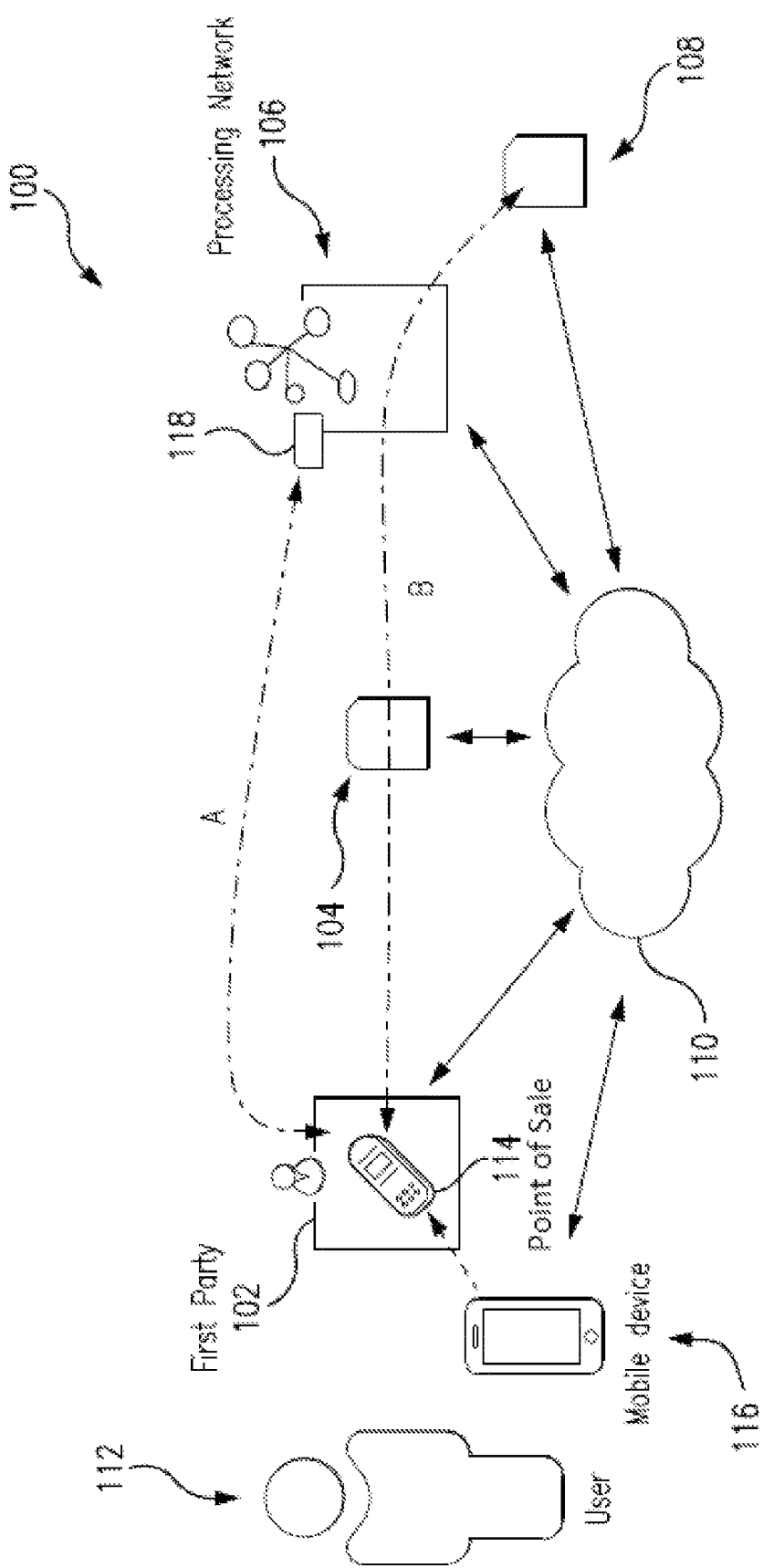
FIG. 1 is a block diagram of an example system of the present disclosure suitable for use in verifying interactions, or aspects thereof, based on tags generated for specific one of the interactions.

FIG. 1 illustrates an example system 100 in which the one or more aspects of the present disclosure may be implemented. Although the system 100 is presented in one arrangement, other embodiments may include systems arranged otherwise depending, for example, on the manner of processing interactions, a scheme for communication between the parties therein, types of verification and/or authentication, privacy regulations, agreements between the parties, etc.

The system 100 generally includes a first party 102, an acquiring party 104, a processing network 106, and an issuing party 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 110 may include multiple different networks, such as a private payment transaction network made accessible by the processing network 106 to the acquiring party 104 and the issuing party 108 and, separately, the public Internet, which is accessible as desired to the first party 102, the acquiring party 104, the issuing party 108, and a user 112.

In the illustrated embodiment, the first party 102 generally includes a merchant, or provider associated with products (e.g., goods, services, etc.) offered for sale to one or more users (e.g., the user 112, etc.). In addition in the illustrated embodiment, the first party 102 includes a point-of-sale (POS) system 114 (e.g., including a POS terminal, etc.) that can be used in connection with effecting an interaction for the purchase of one or more products, whereby the interaction may be funded by an account of the users 112.

The user 112 is associated with the account, which is issued as a payment account by the issuing party 108. The payment account is associated with a payment card (not shown). The payment card may include, without limitation, for example, a credit card, a debit card, etc. The payment card, in turn, is configured to transmit a payment credential associated with the payment account, such as, for example, a primary account number or PAN, when swiped or inserted or tapped at a POS terminal of the POS system 114. In addition, the payment card includes the PAN embossed, printed, or otherwise visible thereon, to permit the user 112 to read and communicate the PAN to another party. The POS system 114 may also be used to facilitate card-not-present transactions to the user's account (in which examples the physical card is not presented to the terminal of the POS system 114 but the transaction may still be facilitated via an integration with the first party's POS system 114, etc.).

Further, the user 112 is associated with a mobile device 116, which may include, for example, a smartphone, a tablet, a laptop, or another suitable type of mobile computing device, etc., which is generally mobile with the user 112.

Thereafter, as part of the interaction, to fund the transaction between the user 112 and the first party 102, via the payment account, the user 112 either presents the payment card to the first party 102, or not. For example, the user 112 may swipe or tap or insert the payment card, when physically present at the first party 102, at the terminal of the POS system 114. This is referred to herein as a card-present (or card presented) transaction. The terminal of the POS system 114 is configured to then compile an authorization request for the interaction and to transmit the authorization request, along path B in FIG. 1, to the processing network 106, via the acquiring party 104. The processing network 106 is configured to transmit the authorization request to the issuing party 108. The issuing party 108, in turn, is configured to determine to approve or decline the transaction. The issuing party 108 is configured to then compile an authorization reply, which includes either the approval or the decline, and then to transmit the authorization reply back to the first party 102 (and specifically, the terminal of the POS system 114), via the processing network 106 and the acquiring party 104 (again, generally along path B).

The authorization request and also the authorization reply, may be messages consistent with the ISO 8583 standard. As such, the authorization message may include multiple data elements (DEs) (e.g., as part of an ISO 8583 message, etc.), of which one of the a data elements includes (or is populated with) an indicator (or identifier) to indicate card present for the transaction (for example, when the card is presented to the terminal of the POS system 114 at the first party 102, etc.). That said, it should be appreciated that the authorization request and also the authorization reply may be messages consistent with other standards and/or formats in other embodiments (e.g., the request and the reply are not limited to the ISO 8583 standard, etc.). For instance, the authorization request and also the authorization reply may be messages consistent with the ISO 20022 standard, may be messages facilitated through application programming interfaces used for the purpose of financial authorization, etc.

Other types of interactions, then, are referred to herein as card-not-present transactions. For example, when the user 112 reads the PAN from the payment card, and then enters the PAN to a website associated with the first party 102, or communicates the PAN over the phone to an agent of the first party 102, the interaction is considered a card-not-present transaction. In such transaction, the authorization message, which is consistent with the ISO 8583 standard, includes a data element in which an indicator (or identifier) is included to indicate card not present for the transaction.

It should be understood, therefore, that the card present and card not present indicator may be instructive to the issuing party 108 is assessing the propriety of the transaction to either approve or decline the transaction. As the form of interaction changes, however, additional data may be necessary to more completely assess the card-present or card-not present situation.

As such, in this example embodiment, the processing network 106 is configured to generate a data tag, which is specific to the interaction and which is passed along with the authorization request, by the first party 102, for the interaction. The data tag includes advanced data related to the interaction, which is indicative of more detail than either the card present or card not present designation. In this example embodiment, the processing network 106 is configured to provide a data tag service for facilitating the data tag.

In particular, in one specific card-not present embodiment, the payment account is provisioned, or stored with the first party 102, either in the form of a PAN or a token linked to the PAN (either by the first party 102 or the processing network 106 or the issuing party 108, etc.). This is referred to herein, in this embodiment, as "card on file," whereby the PAN or a token associated with the PAN is stored at the first party 102, or in a mobile application associated with the first party 102. For example, a "First Party Pay" option may include the PAN for the payment account of the user 112 being provisioned as a token or otherwise by the first party 102 to the user 112, via a "First Party Pay" application in the mobile device 116 of the user 112 (as shown in FIG. 1) or otherwise, etc. The payment account may therefore be provisioned to be accessible (or recallable) to the user 112, either through the application at the mobile device 116 to define a funding source for the transaction without the payment card being presented to the first party 102, etc.

As part of the "card on file" option, the first party 102 is configured to define one or more types of verification (and/or authentication) of the user 112, whereby the token, which is stored on-file, is accessible or usable by the user 122.

That is, the first party 102 is configured to solicit and/or impose verification requirements for access to the PAN or token, etc. (which may or may not include actual authentication of the user 112 but which generally provides a confirmation of presence of the user 112 at the first party 102, etc.). For example, where the token is provisioned to the mobile device 116 of the user 112, the mobile device 116, as configured by an application associated with and/or linked to the pay option, may require a specific biometric to access the pay option application (e.g., a biometric for providing both verification and authentication of the user 112, etc.), from which the token may be shared/used. In another example, the mobile device 116, as configured by the pay option application, may require use of a one time passcode (OTP) (e.g., an OTP for providing both verification and authentication of the user 112, etc.), which is sent (e.g., by the first party 102, etc.) to the mobile device 116, via a text message, and then entered by the user 112 to the pay option application, from which the token may be shared/used. In yet another example, the mobile device 116, as configured by the pay option application, may require a capture of a QR code associated with the interaction and user 112, prior to permitting the token to be shared/used.

In still another example, where the user 112 interacts with the first party 102 via a website of the first party 102, the first party 102, or specifically, the website, may be configured to require any of the above verification types to access the provisioned payment account to fund a transaction between the user 112 and the first party 102. For example, the website may be configured to send a OTP to the mobile device 116, which, then is entered by the user 112 to the website, as a form of verification of the user 112 (and which may also provide authentication of the user 112).

Regardless of the type of verification required, or desired, the first party 102 is configured to enroll with that type(s) of verification with the processing network 106. For example, the first party 102 may enroll and specify one or more types of verification for one or more of the scenarios above. That is, for example, the first party 102 may require presentation of a specific biometric through a pay application in the mobile device 116, while requiring an OTP for use of the website of the first party 102. It should be appreciated that the first party 102 and other parties may define any type or types of verification, as part of enrollment, for interacting with the user 112 or other users. In general, verification of the user 112 may be defined by the processing network 106 and/or the first party 102, where the first party 102 establishes a connection to the user 112 (e.g., to a user profile associated with the user 112, etc.) via an enrolled verification type, for example, that places the user 112 in the premises of the first party 102.

In addition, the user 112 (and other users) may be enrolled (e.g., may elect to enroll and/or provide permission for enrollment, etc.) for the verification herein (e.g., by the first party 102, etc.) based on having previously stored a payment card or payment information with the first party (e.g., the user 112 already has a card on file with the first party 102, etc.). Or, the user 112 may enroll for the verification herein following (or as part of) a transaction with the first party 102, etc. In either case, as part of the enrollment process, the user 112 may also be authenticated based on payment credentials provided (e.g., a card number, etc.), to provide assurance that subsequent transactions using the payment credentials are by the enrolled user 112.

Once the user 112 is enrolled with the verification(s), for a particular transaction, the first party 102 is then configured to submit a data tag request, along path A in FIG. 1, for one or more card-not-present transactions, where the provisioned payment account is used to fund the transaction. In particular, in response to the request for the transaction, the first party 102 is configured to verify the user 112, as appropriate (e.g., via one or more of a biometric, a PIN, an OTP, a QR code, etc.) (e.g., through the mobile device 116, through a browser, or otherwise, etc.) and then to call an application programming interface (API) exposed by the processing network 106, and more specifically, by a computing device 118 of the processing network 106, which is associated with the data tag service provided by the processing network 106. The API call is a data tag request, which includes one or more indicators of the type of verification employed (e.g., biometric, PIN, OTP, QR code, etc.; verification through an application at the mobile device 116, verification through a website associated with the first party 102, etc.) and also an identifier of the first party 102. This may include, for example, a merchant identifier (ID) (specific to the first party 102, or location of the first party 102, etc.), a terminal identifier (ID) (specific to the terminal of the POS system 114), and/or a transaction identifier (ID) (specific to the transaction), etc.

In response to the data tag request, the computing device 118 of the processing network 106 is configured to, optionally, verify one or more rules associated with the first party 102. For example, the processing network 106 may be configured to identify the first party 102 (based on enrollment thereof) and to confirm that the type of verification in the API call is consistent with an approved verification, or a listing of approved types of verification associated with the identified first party 102, etc. The rules may be location specific (e.g., location X of the first party 102 versus location Y of the first party 102, etc.), or specific to the terminal (e.g., terminal of the POS system 114, etc.). For example, where the API call/data tag request includes an indication of user verification via presentation of an OTP in connection with a pay application in the mobile device 116 providing a token, the one or more rules may indicate verification via a biometric is actually required. If the one or more rules is violated, the processing network 106 may be configured to issue an error, a violation notification, or otherwise decline to provide a data tag.

Thereafter, where the one or more rules, if applied, are satisfied, the computing device 118 of the processing network 106 is configured to generate a data tag, which includes, in this example embodiment, an identifier for the type of verification (e.g., biometric, PIN, etc.) (e.g., a code indicative of one or more of the types of verification, etc.), a time stamp, an identifier of receipt by the processing network 106 (e.g., an identifier associated with the specific computing device 118 of the processing network 106 at which the data tag request is received, etc.), and a unique number. An example data tag is included in Table 1 below.

TABLE 1

| Verification Method Identifier (first 25 char.) | Time Stamp (next 8 char.) | Identifier of Receipt (next 2 char.) | Unique Number (next 5 char.) |
| --- | --- | --- | --- |
| XXXXXXXXXXXXXXXXXXXXXXXXX-XXXXXXXX-XX-XXXXX | | | |

As shown above, the data tag includes the concatenation of the above listed data parts, but may be generated otherwise in other embodiments. It should also be appreciated that the characters and/or data parts of the data tag may be arranged otherwise in other examples (e.g., in other orders, etc.). For instance, the verification method identifier may include more or less than twenty-five characters in other embodiments (e.g., twenty characters, twenty-four characters, thirty characters, etc.). In addition, the time stamp may include more or less than eight characters (e.g., fie characters, ten characters, fifteen characters, etc.); the identifier of receipt may include more or less than two characters (e.g., one character, three characters, five characters, etc.); and the unique number may include more or less than five characters (e.g., one character, three characters, seven characters, ten characters, etc.). Further, the data parts of the data tag may be expressed as binary, as decimal, as hexadecimal, and/or as another suitable format, and may further include a different number of characters (e.g., letters, numbers, etc.), per part of the data tag, etc. For example, the verification method identifier may be binary or decimal, while the time stamp, the identifier of receipt and the unique number may be hexadecimal, etc. In addition, the data tag may include other data, such as, for example, an identifier associated with the first party 102, etc.

In connection with generating the data tag, the processing network 106 is configured to generate the unique number. In this way, the unique number may be a randomly generated number, in this example, or another numeric, alpha, or alpha-numeric number, which is random, in whole or in part. It should be appreciated that the random number may be generated, for example, by any suitable random number generator (e.g., whereby the number may be random, or merely unpredictable, yet within the scope of the term random; etc.). The processing network 106 is configured to store the data tag (i.e., the identifier for the type of verification, the identifier of the first party 102, and a unique number in this example) in memory associated therewith (e.g., in a data structure, etc.).

The computing device 118 of the processing network 106 is then configured to transmit the data tag back to the first party 102, and specifically, the terminal of the POS system 114, etc., in response to the API call/data tag request (e.g., along path A again, etc.).

While the data tag request is described with reference to the API call above, it should be appreciated that the POS system 114, or more generally, the first party 102, may be configured to request and received the data tag through other channels. In one specific example, the POS system 114 may be configured to submit the data tag request as an ISO 8583 message (e.g., via the acquiring party 104 (i.e., on the payment rails along path B, etc.), etc.) (regardless of whether the underlying transaction is a card present transaction or a card-not-present transaction, etc.).

Next in the system 100, upon receipt of the data tag, the terminal of the POS system 114, consistent with the above, is configured to generate an authorization request for the transaction. The authorization request in general includes a PAN or token for the account of the user 112, an identifier of the first party 102, an amount of the transaction, time stamp, acquirer identifier, address, etc., and other suitable data associated with the transaction, and also the data tag. The data tag may be included in any suitable data element (DE) of the authorization request, which may, in turn, be consistent with a 0100 or 0200 message(s), which is consistent with the ISO 8583 standard. In one specific embodiment, the data tag is included in DE48, sub-element 48, sub-field 04, of an ISO 8583 standard message, but again may be at other data elements in other embodiments (and/or in other message standards/formats).

The terminal of the POS system 114 is configured to transmit the authorization request to the issuing party 108, through the acquiring party 104 and the processing network 106. When the authorization request reaches the processing network 106, though (before the processing network 106 transmits the authorization request to the issuing party 108), the processing network 106 is configured to intercept, inhibit or hold the authorization request (e.g., not transmit the authorization request to the issuing party 108, etc.) and verify the data tag included in the authorization request against the data tag stored in the memory (associated with the computing device 118) for the transaction (e.g., based on the identifier of receipt and the timestamp, etc.). When the data tags match, the processing network 106 may be configured to permit (e.g., release, etc.) the authorization request to proceed to the issuing party 108, whereby the issuing party 108 makes a determination with regard to authorization of the transaction, or not. The processing network 106, additionally or alternatively, may be configured to modify the authorization request, at the data tag or otherwise, to indicate the match and/or the type of verification used in the transaction.

Conversely, if the data tags do not match, the processing network 106 may be configured to decline the transaction (e.g., generate and transmit an authorization reply indicating decline, etc.), or the processing network 106 may be configured to modify the authorization request to remove the data tag and/or indicate the mismatch between the data tag included in the authorization request against the data tag stored in the memory for the transaction. In the later, the processing network 106 may then transmit the modified authorization request to the issuing party 108 whereby the transaction proceeds without the verification herein (and the issuing party 108 makes a determination with regard to authorization of the transaction, or not). Here, the lack of matching data tags may indicate to the issuing party 108 that the transaction is of a lower security quality and, as such, may result a lower likelihood of approval and/or may result in modification of one or more benefits associated with the transaction (e.g., a shift in liability, enhanced pricing, etc.). In this way, the verification of the user 112 provided for herein is generally controlled by the processing network 106, in that the processing network 106 will only generate and transmit the data tag to the first party 102 when appropriate and the indication of verification will only be transmitted to the issuing party 108 when the data tag in the underlying authorization request matches the data tag generated and transmitted by the processing network 106.

The issuing party 108, upon receipt of the authorization request, is configured to approve or decline the transaction. In connection therewith, the issuing party 108 may be configured to assess the type of verification, as indicated in the data tag, or consider the modification by the processing network 106 (e.g., that verification of the user 112 was not successful (e.g., based on the data tags not matching, etc.), etc.). The issuing party 108 is configured to then generate and transmit an authorization reply, for the transaction, back to the first party 102, via the processing network 106 and the acquiring party 104. The authorization reply indicates either the approval or decline of the transaction.

In some embodiments, the processing network 106 may not intercept, inhibit or hold the authorization request upon receipt from the acquiring party 104. Instead, upon receipt of the authorization request, the processing network 106 may be configured to route the authorization request to the issuing party 108, as conventional, and then verify the data tag included in the authorization request against the data tag stored in the memory (associated with the computing device 118) for the transaction (e.g., based on the identifier of receipt and the timestamp, etc.). The processing network 106 may then provide a subsequent indication to the issuing party 108 regarding whether or not the data tags match.

While only one first party 102 and one user 112 are shown in the system 100 in FIG. 1, it should be appreciated that multiple first parties and/or users may be included in the system 100 or as part of other systems in other embodiments. Similarly, while only one acquiring party 104, one processing network 106, and one issuing party 108 are illustrated, it should be appreciated that any number of these entities (and their associated components) may be included in the system 100, or may be included as a part of systems in other embodiments, consistent with the present disclosure.

Figure 2:
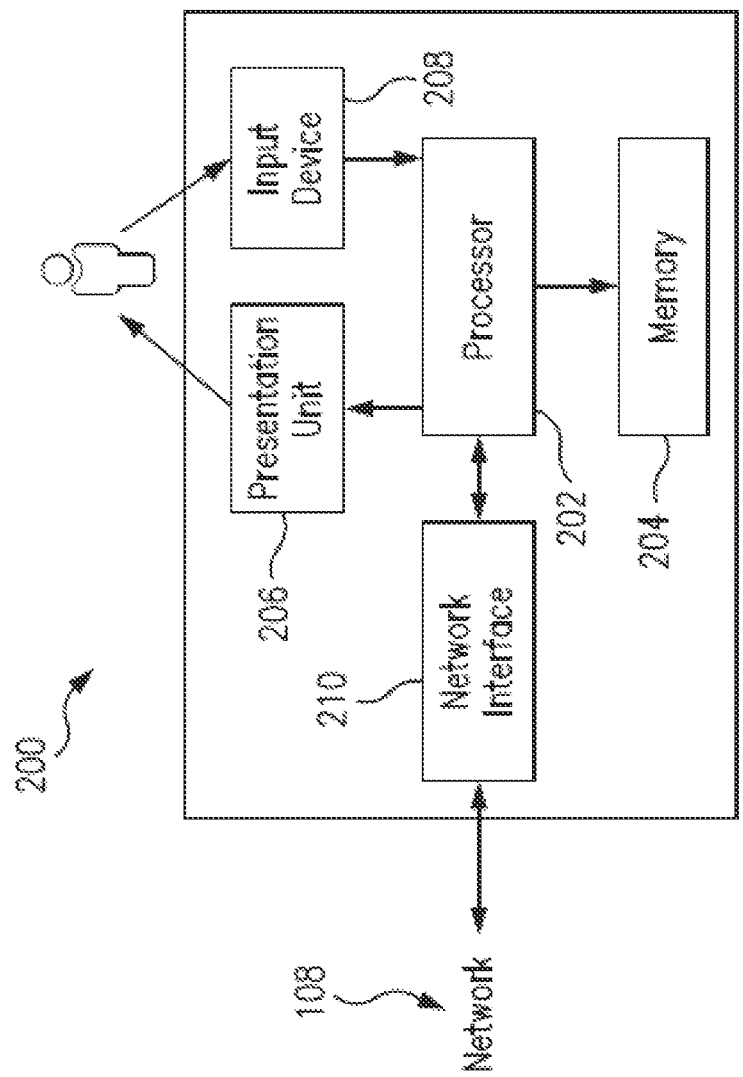
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, PDAs, POS terminals, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices. In the system 100 of FIG. 1, each of the acquiring party 104, the processing network 106, and the issuing party 108 may include, or may be implemented in, a computing device 200, coupled to (and in communication with) the network 110. In addition, the terminal of the POS system 114 of the first party 102 and the mobile device 116 may also be consistent with the computing device 200.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable storage media. The memory 204 may be configured to store, without limitation, data tags, identifiers, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more operations of method 300, etc.), such that the memory 204 is a physical, tangible, and non-transitory computer readable storage media. Such instructions often improve the efficiencies and/or performance of the processor 202 that is performing one or more of the various operations herein (e.g., one or more operations of method 300, etc.). It should be appreciated that the memory 204 may include a variety of different memories, each implemented in one or more of the operations or processes described herein.

In the example embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., verification instructions, OTPs, etc.), either visually or audibly to a user of the computing device 200, for example, the user 112 in the system 100 (e.g., at the mobile device 116, etc.). Various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, verification inputs, etc., or inputs from other computing devices. The input device 208 is coupled to (and is in communication with) the processor 202 and may include, for example, a keyboard, a pointing device, a mouse, a stylus, a biometric reader, a touch sensitive panel (e.g., a touch pad or a touch screen, etc.), another computing device, and/or an audio input device. Further, in various example embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 110. Further, in some example embodiments, the computing device 200 includes the processor 202 and one or more network interfaces incorporated into or with the processor 202.

Figure 3:
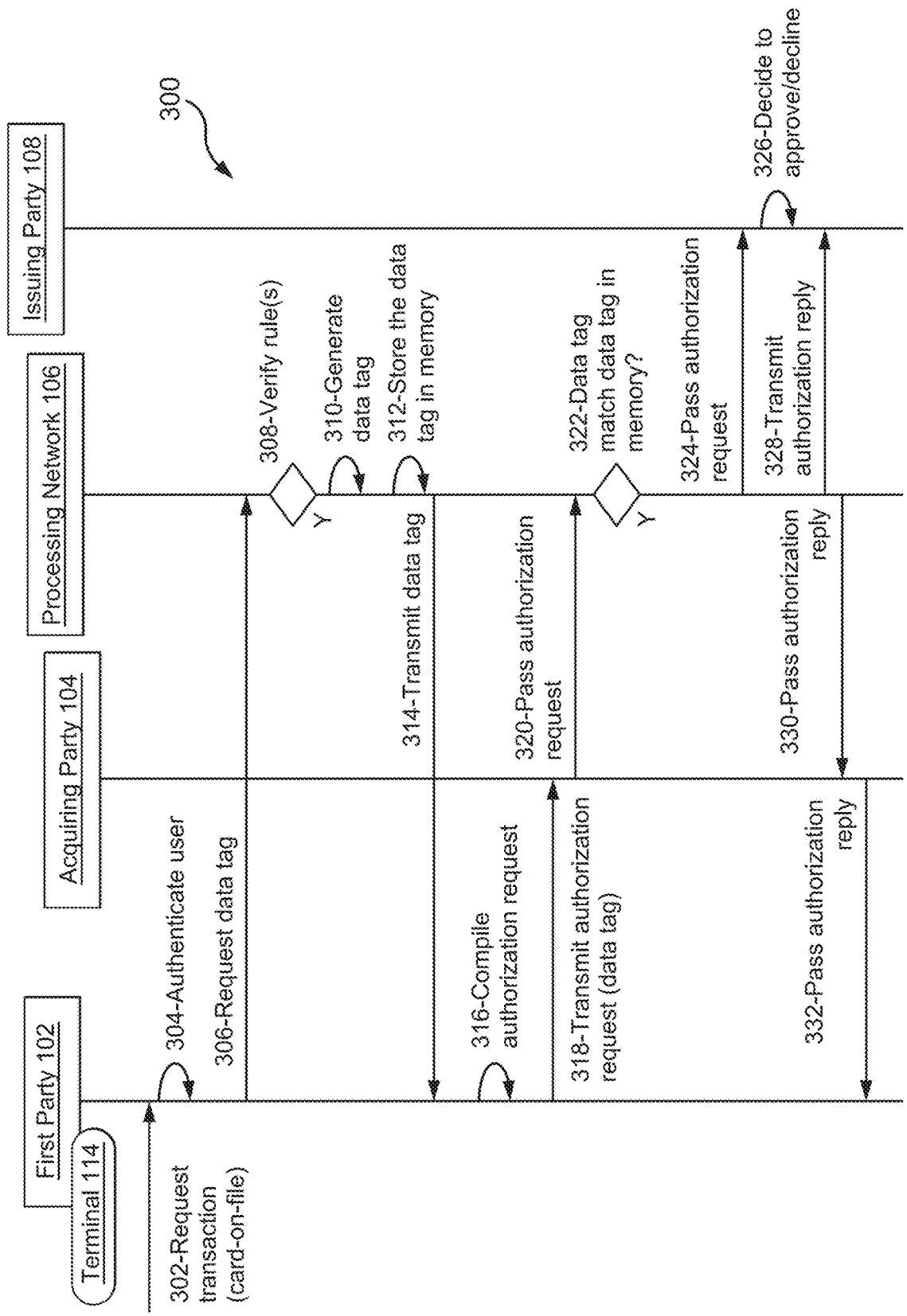
FIG. 3 is an example method that may be implemented in the system of FIG. 1 for use in verifying an interaction between a user and a first party, in which the user is present at the first party, based on a data tag for the specific interaction.

FIG. 3 illustrates an example method 300 for use in verifying an interaction, between a user and a first party, in which the user is physically present at the first party, and based on a data tag for the specific interaction. The example method 300 is described with reference to the system 100 as implemented, in part, in the processing network 106 and the terminal of the POS system 114 associated with the first party 102, and with additional reference to the computing device 200. However, the methods herein should not be understood to be limited to the example system 100 or the example computing device 200, and likewise, the systems and the computing devices herein should not be understood to be limited to the example method 300.

In the method 300, initially, the user 112 initiates a transaction to a payment account, at 302, through a card-on-file setup (e.g., through a pay application at the mobile device 116, etc.). In response, at 304, the first party 102 verifies (and may also authenticate) the user 112 consistent with the card-on-file implementation. For example, the verification may include a biometric verification and/or authentication at a pay application in the mobile device 116, etc.

Once the user 112 is verified, the first party 102 (or terminal of the POS system 114) receives the payment credential (e.g., token, etc.) from the mobile device 116 (in this example) and then, at 306, requests a data tag for the transaction, through an API call, to the processing network 106. The request includes an indicator of the type of verification completed (e.g., biometric verification/authentication, etc.). The processing network 106, in turn, receives the request for the data tag, via the API call, at a specific computing device of the processing network 106. The computing device is associated with an identifier.

In connection with receipt of the request, at 308, the processing network 106 verifies that the type of verification is consistent with one or more rules associated with the first party 102. When the one or more rules are verified, the processing network 106 compiles (or generates), at 310, the data tag. In this example embodiment, the processing network 106 generates the data tag by concatenating an indicator of the type of verification, an identifier of receipt (i.e., an indicator of the computing device at which the request for the data tag was received), a time stamp at which the request for the data tag was received (or compiled), and a unique number. The data tag may be consistent with the example data tag in Table 1, for example. It should be appreciated that the data tag may include less or more data in other embodiments. For example, the identifier of receipt may be omitted in other embodiments, while a transaction identifier, or other suitable identifier is included.

Once generated, the data tag is stored in memory of the processing network 106, at 312, and then transmitted back to the first party 102, at 314.

The terminal of the POS system 114 then compiles, at 316, the authorization request for the transaction. In general, the authorization request includes various transaction data for the transaction (e.g., an amount of the transaction, a time stamp for the transaction, merchant ID, etc.). In addition in the method 300, the authorization request includes the data tag generated for the transaction. In this example, the terminal of the POS system 114 may compile the authorization request as an ISO 8583 message (e.g., an ISO 0100 message, an ISO 0200 message, etc.) for the transaction, to be transmitted to the acquiring party 104 and processing network 106, etc., to determine if the transaction is to be approved, or not. The ISO 8583 message may include various data elements, which include data related to the requested transaction, including for example, the PAN of the user's payment account, the CVV and expiration date of the user's payment device, the user's name, a merchant ID for the first party 102, an ID for the terminal of the POS system 114, etc. Typically, such transaction data is compiled into the message as defined by the ISO 8583 standard. In addition in this example, the ISO 8583 message includes the data tag in one of the available data elements of the message. Specifically, for example, the data tag may be included in DE 48.

It should be apparent that the data tag may be included in the authorization request in a variety of different manners (e.g., at any desired available data element, sub-element, etc.).

Then in the method 300, the terminal of the POS system 114 transmits the authorization request, at 318, to the acquiring party 104. The acquiring party 104 then passes, at 320, the authorization request to the processing network 106. And, the processing network 106 holds the authorization request for further processing (as described next).

In turn, the processing network 106 retrieves the data tag from memory (e.g., the memory 204, etc.), based on the time stamp and/or the identifier of receipt, or other data included in the data tag. And, at 322, the processing network 106 determines whether the data tag included in the authorization request matches the data tag stored in the memory. While not shown, when the data tags do not match (or only partially match), the processing network 106 may downgrade the transaction, for example, to a card-not-present status and/or remove the data tag from the authorization request (broadly, modify or edit the authorization request to remove the data tag from the given data element, etc.). The processing network 106 may then pass the authorization request to the issuing party 108 (e.g., at 324, etc.) for conventional processing (but without indication that the user has been verified).

When there is a match, at 322, the processing network 106 maintains the data tag in the authorization request. And, at 324, the processing network 106 passes the authorization request (with the data tag maintained therein) to the issuing party 108.

In turn, the issuing party 108 determines, at 326, whether to approve or decline the transaction. In connection therewith, the issuing party 108 may consider the data tag, and specifically, the type(s) of verification used by the first party 102 relative to the user 112. In this manner, the issuing party 108 is provided further insights into the interaction between the user 112 and the first party 102, beyond a mere indication of card present or card not present, which is usable to approve or decline the transaction. The issuing party 108 then compiles and transmits, at 328, an authorization reply (approving or declining the transaction) to the processing network 106.

The processing network 106 passes the authorization reply to the acquiring party 104, at 330, and the acquiring party 104 passes the authorization reply to the first party 102 at 332.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a data tag request specific to a transaction, from a first party, via an application programming interface (API) call, the data tag request including an indicator of at least one type of verification for the transaction; (b) generating a data tag for the transaction, the data tag including the indicator of the at least one type of verification, a time stamp and a unique random number; (c) storing the data tag in a data structure as a stored data tag; (d) transmitting the data tag to the first party, in response to the data tag request; (e) receiving an authorization request including the data tag; (f) verifying that the data tag from the authorization request matches the stored data tag; (g) in response to failed verification of the data tag from the authorization request, removing the data tag from the authorization request; (h) verifying the at least one type of verification as being consistent with one or more rules associated with the first party for the transaction; (i) retrieving, from the data structure in a memory of the computing device, the stored data tag from the data structure based on at least the time stamp of the data tag from the authorization request; and (j) passing the authorization request, after removing the data tag from the authorization request, to an issuing party associated with an account identified in the authorization request.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in verifying an interaction, between a user and a first party, in which the user is physically present at the first party, the method comprising:
    receiving, by a computing device, a data tag request specific to a transaction, from a first party, via an application programming interface (API) call, the data tag request including an indicator of at least one type of verification of the user for the transaction, the transaction being a payment account transaction;
    verifying, by the computing device, that the at least one type of verification is consistent with one or more rules, the one or more rules specific to the first party;
    in response to the at least one type of verification being consistent with the one or more rules:
        generating, by the computing device, a first data tag for the transaction, the first data tag including the indicator of the at least one type of verification, a time stamp and a unique random number;
        storing the first data tag in a data structure as a stored first data tag; and
        transmitting, by the computing device, the first data tag to the first party, in response to the data tag request; and then,
    receiving, by a processing network, from the first party, an authorization request for the transaction, the authorization request including a card-on-file token of the first party for an account of the user and a second data tag;
    verifying, by the processing network, that the second data tag from the authorization request matches the stored first data tag;
    in response to failed verification of the second data tag from the authorization request, removing, by the processing network, the second data tag from the authorization request; and
    transmitting, by the computing device, the authorization request with the second data tag removed, to an issuing party of the account identified in the authorization request.

2. The computer-implemented method of claim 1, wherein the first data tag further includes an identifier specific to the computing device; and
    wherein the unique random number includes alpha-numeric characters; and
    wherein the authorization request is consistent with one of: ISO 8583 standard and ISO 2022 standard.

3. The computer-implemented method of claim 2, wherein generating the first data tag includes concatenating the indicator of the at least one type of verification, the time stamp, the identifier specific to the computing device, and the unique random number.

4. The computer-implemented method of claim 1, further comprising retrieving, from the data structure in a memory of the computing device, the stored first data tag from the data structure based on at least the time stamp of the second data tag from the authorization request.

5. The computer-implemented method of claim 1, wherein the at least one type of verification includes at least one of biometric authentication and one-time-passcode (OTP) authentication.

6. A system for use in verifying an interaction, between a user and a first party, in which the user is present at the first party, the system comprising:
    a processing network including a first computing device and a second computing device, the first computing device configured to:
        receive a data tag request specific to a transaction, from a first party, via an application programming interface (API) call, the data tag request including an indicator of at least one type of verification of the user for the transaction, the transaction being a payment account transaction;
        verify the at least one type of verification based on one or more rules specific to the first party;
        in response to the at least one type of verification being verified, generate a first data tag for the transaction, the first data tag including the indicator of the at least one type of verification, a time stamp and a unique random number;
        store the first data tag in a data structure in a memory as a stored first data tag; and
        transmit the first data tag to the first party, in response to the data tag request; and wherein the second computing device is configured to:
        receive an authorization request for the transaction, the authorization request including a card-on-file token of the first party for an account of the user and a second data tag;
        verify the second data tag from the authorization request matches the stored first data tag;
        in response to the second data tag from the authorization request not matching the stored first data tag, remove the second data tag from the authorization request and transmit the authorization request with the second data tag removed, to an issuing party of the account identified in the authorization request; and in response to the second data tag from the authorization request matching the stored first data tag, transmit the authorization request with the second data tag included, to an issuing party of the account identified in the authorization request.

7. The system of claim 6, wherein the first data tag further includes an identifier specific to the computing device; and
wherein the unique random number includes numeric characters.

8. The system of claim 7, wherein the first computing device is configured, in generating the first data tag, to concatenate the indicator of the at least one type of verification, the time stamp, the identifier specific to the computing device, and the unique random number.

9. The system of claim 6, wherein the second computing device is configured to retrieve, from the data structure, the stored first data tag from the data structure based on at least the time stamp of the second data tag from the authorization request.

10. A non-transitory computer-readable storage medium including computer executable instructions, which when executed by at least one processor of a computing device, cause the at least one processor to:

receive a data tag request specific to a transaction, from a first party, the data tag request including an indicator of at least one type of verification of a user for the transaction, the transaction being a payment account transaction;

verify the at least one type of verification based on one or more rules specific to the first party;

in response to the at least one type of verification being verified, generate a first data tag for the transaction, the first data tag including the indicator of the at least one type of verification, a time stamp and a unique random number;

store the first data tag in a data structure in a memory;

transmit the first data tag to the first party, in response to the data tag request;

receive an authorization request for the transaction, the authorization request including a card-on-file token of the first party for an account of the user and a second data tag;

when the second data tag from the authorization request does not match the stored first data tag, remove the second data tag from the authorization request and transmit the authorization request with the second data tag removed, to an issuing party of the account identified in the authorization request; and when the second data tag from the authorization request matches the stored first data tag, transmit the authorization request with the second data tag included, to an issuing party of the account identified in the authorization request.

11. The non-transitory computer-readable storage medium of claim 10, wherein the first data tag further includes an identifier specific to the computing device; and
wherein the unique random number includes numeric characters.

12. The non-transitory computer-readable storage medium of claim 11, wherein the executable instructions, when executed by the at least one processor to generate the first data tag, cause the at least one processor to concatenate the indicator of the at least one type of verification, the time stamp, the identifier specific to the computing device, and the unique random number.

13. The non-transitory computer-readable storage medium of claim 10, wherein the executable instructions, when executed by the at least one processor, further cause the at least one processor to retrieve, from the data structure, the stored first data tag from the data structure based on at least the time stamp of the second data tag from the authorization request.

* * * * *